ID [19]

United States Patent
Ginger et al.

[11] 4,241,033
[45] Dec. 23, 1980

[54] PROCESS FOR THE SEPARATION OF SULFUR OXIDES FROM A GASEOUS MIXTURE CONTAINING SULFUR OXIDES AND OXYGEN

[75] Inventors: Edward A. Ginger, Northbrook; Armand J. deRosset, Clarendon Hills, both of Ill.

[73] Assignee: UOP Inc., Des Plaines, Ill.

[21] Appl. No.: 8,712

[22] Filed: Feb. 1, 1979

Related U.S. Application Data

[63] Continuation-in-part of Ser. No. 852,393, Nov. 17, 1977, abandoned, which is a continuation-in-part of Ser. No. 748,995, Dec. 9, 1976, abandoned.

[51] Int. Cl.$^3$ .................... B01J 8/00; C01B 17/00; C09K 3/00
[52] U.S. Cl. ..................................... 423/244; 252/190
[58] Field of Search .......... 423/242 A, 242 R, 244 A, 423/244 R; 252/466 PT, 474, 190; 55/73, 74, 387

[56] References Cited

U.S. PATENT DOCUMENTS

| | | | |
|---|---|---|---|
| 3,501,897 | 3/1970 | Van Helden et al. | 55/73 |
| 3,778,501 | 12/1973 | Lang et al. | 423/244 |
| 3,794,588 | 2/1974 | Stiles | 252/466 PT |
| 3,816,597 | 6/1974 | Smith | 423/244 |
| 3,864,451 | 2/1975 | Lee et al. | 423/244 |
| 3,972,829 | 8/1976 | Michalko | 252/466 PT |
| 3,981,825 | 9/1976 | Reagan et al. | 252/466 PT |
| 3,998,759 | 12/1976 | Hockstra | 252/466 PT |
| 4,117,082 | 9/1978 | Matsuyama | 252/466 |

*Primary Examiner*—O. R. Vertiz
*Assistant Examiner*—Gregory A. Heller
*Attorney, Agent, or Firm*—James R. Hoatson, Jr.; Robert W. Welch; William H. Page, II

[57] ABSTRACT

An improved process for the separation of sulfur oxides from a gaseous mixture containing sulfur oxides and oxygen is disclosed. The gaseous mixture is contacted with a solid sulfur oxide acceptor comprising copper, copper oxide, or a mixture thereof dispersed on a carrier material in combination with a platinum group metal component and a component selected from the group consisting of rhenium, germanium and tin.

11 Claims, No Drawings

PROCESS FOR THE SEPARATION OF SULFUR OXIDES FROM A GASEOUS MIXTURE CONTAINING SULFUR OXIDES AND OXYGEN

CROSS-REFERENCE TO RELATED APPLICATIONS

This application is a Continuation-In-Part of a copending application Ser. No. 852,393, filed Nov. 17, 1977, now abandoned, which is in turn a Continuation-In-Part of application Ser. No. 748,995, filed Dec. 9, 1976, now abandoned.

It has become well known that sulfer oxides are among the major pollutants of our environment. In this country alone, sulfur oxides discharged to the atmosphere from all sources measure in the millions of tons on an annual basis. The increasingly deleterious effect of the sulfurous pollutants with respect to cardiorespiratory disease, eye irritation, and the like, has promoted rather severe legislative action governing the discharge of said pollutants, particularly in the more densely populated areas where the problem is more acute. It has been recognized that sulfur oxides discharged to the atmosphere as a component of flue gases from industrial furnaces burning high sulfur coal or fuel oil, constitute a substantial if not major portion of the total sulfur oxides discharged to the atmosphere.

Sulfur oxides are inorganic in nature and are conveniently separated from an oxygen-containing gas mixture, such as flue gas, on contacting the mixture with a solid acceptor at elevated temperature. Typically, the solid acceptor comprises a supported copper and/or copper oxide capable of retaining the sulfur oxides as a sulfate. The process can be used to remove sulfur oxides from flue gases so that the latter may be freely discharged to the atmosphere. Since the solid acceptor requires frequent regeneration, the process generally comprises a repeating acceptance-regeneration cycle. During regeneration, the sulfate is decomposed at an elevated temperature in the presence of a reducing gas to yield a regenerated acceptor and a regeneration off-gas of increased sulfur dioxide concentration. This off-gas is useful, for example, in the manufacture of sulfuric acid and elemental sulfur.

It is an object of this invention to present an improved process for the separation of sulfur oxides from a gaseous mixture comprising sulfur oxides and oxygen.

The present invention relates to a process for the separation of sulfur oxides from a gaseous mixture containing sulfur oxides and oxygen in which said gaseous mixture is contacted with a solid sulfur oxides acceptor at a temperature of from about 150° to about 450° C., and in which said solid acceptor is regenerated with a reducing gas, and, in one of its broad aspects, embodies the improvement which comprises contacting said gaseous mixture with a solid sulfur oxides acceptor comprising copper, copper oxide, or a mixture thereof, dispersed on a carrier material in combination with a platinum group metal, or an oxide thereof, and a component selected from the group consisting of germanium, rhenium, tin, and the oxides thereof.

Another and more specific embodiment of this invention concerns the improvement which comprises contacting said gaseous mixture with a solid sulfur oxides acceptor comprising copper, copper oxide or a mixture thereof dispersed on an alumina carrier material in combination with platinum and a component selected from the group consisting of germanium, rhenium, tin, and the oxides thereof, for the separation of sulfur oxides from a gaseous mixture comprising sulfur dioxide and oxygen.

A still more specific embodiment concerns the improvement which comprises contacting said gaseous mixture with a solid sulfur oxides acceptor comprising copper, copper oxide, or a mixture thereof dispersed on a gamma-alumina carrier material in combination with from about 0.01 to about 1.0 wt.% platinum and from about 0.01 to about 1.0 wt.% rhenium, for the separation of sulfur oxides from a gaseous mixture comprising sulfur oxides and oxygen.

Other objects and embodiments of this invention will become apparent in the following detailed specification.

In the art relating to the separation of sulfur oxides from a gaseous mixture comprising sulfur oxides and oxygen, solid acceptors comprising copper, copper oxide or mixtures thereof are well known. The copper component is most often dispersed on a refractory inorganic oxide carrier material. Refractory inorganic oxides suitable for use include naturally occurring materials, for example, clays and silicates such as fuller's earth, attapulgus clay, feldspar, halloysite, montmorillonite, kaolin, and diatomaceous earth, frequently referred to as siliceous earth, diatomaceous silicate, kieselguhr, and the like, and the naturally occurring material may or may not be activated prior to use by one or more treatments including drying, calcining, steaming and/or acid treatment. Synthetically prepared refractory inorganic oxides like alumina, silica, zirconia, boria, thoria, magnesia, titania, chromia, etc., or composites thereof, particularly alumina in combination with one or more refractory inorganic oxides, for example, alumina-silica, alumina-zirconia, alumina-chromia, and the like, are also suitable. Alumina is a preferred refractory inorganic oxide, and the alumina may be any of the various hydrous aluminum oxides or alumina gels including alpha-alumina monohydrate (boehmite), alpha-alumina trihydrate (gibbsite), beta-alumina trihydrate (bayerite), and the like. Activated aluminas, such as have been thermally treated to eliminate substantially all of the water and/or hydroxyl groups commonly associated therewith, are particularly useful. Preferably, the alumina is an activated alumina with a surface area of from about 50 to about 500 square meters per gram, especially gamma-alumina and eta-alumina resulting from the thermal treatment of boehmite alumina and bayerite alumina, respectively, generally at a temperature of from about 400° to about 1000° C. The refractory inorganic oxide may be employed in any suitable shape or form including spheres, pills, extrudates, granules, briquettes, rings, etc. The copper content of the solid acceptor, present as copper and/or copper oxide, but calculated as the elemental metal, is generally in the range of from about 1 to about 25 wt.% depending at least in part on the available surface area of the selected carrier material. The copper component, calculated as the elemental metal, will preferably comprise from about 5 to about 15 wt.% of the solid acceptor.

Pursuant to the improvement of the present invention, the copper component is dispersed on the selected carrier material in combination with a platinum group metal, or an oxide thereof, and a component selected from the group consisting of germanium, rhenium, tin and the oxides thereof. The platinum group metal component has the beneficial effect of increasing the capacity of the solid acceptor for sulfur dioxide over that of conventional acceptors, while effecting substantially complete suppression of sulfur dioxide breakthrough during the acceptance phase of the operation before said capacity is achieved. The platinum group metal component, in combination with the germanium, rhenium and/or tin component, has the further beneficial effect of improving the regeneration characteristics of the solid acceptor, regeneration being effected at a faster rate and to a greater extent. Of the platinum group metals, i.e., platinum, palladium, ruthenium, rhodium, osmium and iridium, platinum and palladium are preferred. The platinum group metal suitably comprises from about 0.01 to about 1.0 wt.% of the solid acceptor. While platinum and palladium are preferred platinum group metals per se, platinum in combination with palladium has provided a further improved acceptor as will hereinafter appear. In the latter case, the combined platinum and palladium suitably comprises from about 0.01 to about 1.0 wt.% of the solid acceptor.

As heretofore mentioned, the platinum group metal component in combination with the germanium, rhenium and/or tin component, effects an improvement in the regeneration characteristics of the solid acceptor. One difficulty heretofore encountered in the regeneration step is that part of the copper sulfate is reduced to copper sulfide rather than the desired elemental copper. This is detrimental to the overall process in that, in addition to consuming larger quantities of reducing gas, the copper sulfide formed has less capacity for sulfur dioxide in the subsequent acceptance phase of the process, and is instead merely oxidized to copper sulfate. The inclusion in the acceptor of the germanium, rhenium and/or tin component to the extent of from about 0.01 to about 1.0 wt.% of said acceptor, inhibits the formation of copper sulfide and the difficulties associated therewith.

The solid acceptor herein contemplated may be prepared in any conventional or otherwise convenient manner. It is a preferred practice to impregnate the desired metal component on a preformed support or carrier material from an aqueous solution of a precursor compound of said metal component, the impregnated carrier material being subsequently dried and calcined to form the desired metal component dispersed on the carrier material. Precursor compounds typically include the halides and nitrates thermally decomposable to the desired metal component under calcination. The metal components are preferably and advantageously impregnated on the selected carrier material from a common impregnating solution.

The solid acceptor of this invention is suitably employed in a fixed bed type of operation utilizing two or more reactors alternating between the acceptance and regeneration phases of the operation to provide a continuous process. The sulfur oxides acceptance phase is usually effected at a temperature of from about 150° to about 450° C. as provided by hot flue gases, a temperature of from about 350° to about 450° C. being preferred. The regeneration phase is carried out at an elevated temperature in the presence of a reducing gas—usually a hydrogen and/or carbon monoxide-containing gas mixture diluted with nitrogen, steam or other suitable diluent. The acceptor is preferably and advantageously regenerated in contact with a reducing gas comprising carbon monoxide and hydrogen in a mole ratio of from about 0.5:1 to about 1.5:1. Regeneration is further advantageously effected in the presence of steam, the regeneration gas preferably comprising from about 50 to about 90 vol.% steam to further inhibit the formation of copper sulfide. Regeneration temperatures may vary over a relatively wide range, but preferably are in the range of from about 350° to about 450° C.

The following examples are presented in illustration of the improvement in flue gas desulfurization resulting from the practice of this invention and are not intended as an undue limitation on the generally broad scope of the invention as set out in the appended claims.

EXAMPLE I

In the preparation of a solid acceptor representative of the prior art, 1/16" spheroidal gamma-alumina particles were employed as a carrier material. The spheroidal particles, precalcined in air for 2 hours at about 1000° C., had an average bulk density of about 0.55 grams per cubic centimeter, an average pore volume of about 0.31 cubic centimeters per gram, an average pore diameter of about 129 Angstroms, and a surface area of about 96 square meters per gram. Three hundred grams of the spheroidal alumina particles were immersed in an impregnating solution of 60.78 grams of copper nitrate trihydrate dissolved in 400 milliliters of water. The alumina spheres were tumbled in the solution of ambient temperature for about ½ hour utilizing a steam-jacketed rotary dryer. Steam was thereafter applied to the dryer jacket and the solution evaporated to dryness in contact with the tumbling spheres. The impregnated spheres were then calcined in air for 2 hours at about 535° C. to yield a solid acceptor containing 5 wt.% copper. This solid acceptor is hereinafter referred to as Acceptor I.

EXAMPLE II

In this example, representing one preferred embodiment of this invention, 1/16" spheroidal gamma-alumina particles, substantially as described in Example I, were utilized as a carrier material. The spheroidal particles, precalcined in air at about 1000° C. for 2 hours, had an average bulk density of about 0.55 grams per cubic centimeter, an average pore volume of about 0.27 cubic centimeters per gram, an average pore diameter of about 120 Angstroms, and a surface area of about 90 square meters per gram. Sixty-five grams of the spheroidal particles were immersed in an impregnating solution contained in a steam-jacketed rotary dryer and prepared by dissolving 13.21 grams of copper nitrate trihydrate, 10.52 milliliters of chloroplatinic acid solution (3.08 mgs of platinum per ml), and 10 milliliters of stannic chloride solution (2.3 mgs of tin per ml) in 87 milliliters of water. The spheres were tumbled in the solution at ambient temperature conditions for about ½ hour. Steam was thereafter applied to the dryer jacket and the solution evaporated to dryness in contact with the tumbling spheres. The impregnated spheres were then calcined in air for 1 hour at 535° C. to yield a solid acceptor containing 5 wt.% copper, 0.05 wt.% platinum, and 0.035 wt.% tin. The solid acceptor of this example is hereinafter referred to as Acceptor II.

EXAMPLE III

This example describes the preparation of a solid acceptor comprising copper, palladium and rhenium on an alumina support—another preferred embodiment of this invention. In this example, 1/16" gamma-alumina spheres, substantially as described in the previous examples, were immersed in an impregnation solution contained in a steam-jacketed rotary dryer. In this case, the impregnating solution was prepared by dissolving about 13.2 grams of copper nitrate trihydrate, 10.8 milliliters of chloropalladic acid solution (3 mgs of palladium per ml), and 2.24 milliliters of perrhenic acid solution (10 mgs of rhenium per ml) and 100 milliliters of water. The spheres were tumbled in the impregnating solution for about ½ hour at ambient temperature conditions, after which steam was applied to the dryer jacket and the solution evaporated to dryness in contact with the tumbling spheres. The impregnated spheres were calcined in air at about 535° C. for 1 hour to yield a solid acceptor containing 5 wt.% copper, 0.05 wt.% palladium and 0.05 wt.% rhenium. The solid acceptor of this example is hereinafter referred to as Acceptor III.

EXAMPLE IV

A particularly preferred embodiment of this invention concerns a solid acceptor comprising copper dispersed on an alumina carrier material in combination with platinum, palladium and rhenium. The solid acceptor was prepared by immersing 1/16" gamma-alumina spheres in an impregnating solution contained in a steam jacketed rotary dryer. The alumina spheres were substantially as described and employed in the previous examples, and the impregnating solution was prepared by dissolving 13.21 grams of copper nitrate trihydrate, 5.26 milliliters of chloroplatinic acid solution (3.08 mgs of platinum per ml), 5.42 milliliters of chloropalladic acid solution (3.0 mgs of palladium per ml), and 3.24 milliliters of perrhenic acid solution (10 mgs of rhenium per ml) in 100 milliliters of water. The alumina spheres were tumbled in the impregnating solution for ½ hour at ambient temperature conditions. Steam was then applied to the dryer jacket and the solution evaporated to dryness in contact with the tumbling spheres. The impregnated spheres were subsequently calcined in air for about 1 hour at 535° C. to yield a solid acceptor containing 5 wt.% copper, 0.025 wt.% platinum, 0.025 wt.% palladium, and 0.05 wt.% rhenium. The solid acceptor of this example is hereinafter referred to as Acceptor IV.

A comparative evaluation of the described solid acceptors was effected. One hundred cubic centimeters of the solid acceptor was in each case disposed as a fixed bed in a vertical tubular reactor with a ⅞" inside diameter. A gaseous mixture comprising about 0.2 vol.% sulfur dioxide, 3 vol.% oxygen, 15 vol.% steam and about 81.8 vol.% nitrogen was preheated to 400° C. and charged upflow through the acceptor bed at a gaseous hourly space velocity of approximately 5100. The reactor effluent was analyzed and discharged to the atmosphere through a wet test meter. After 1 hour of sulfur dioxide acceptance, the solid acceptor was regenerated. Regeneration was effected by preheating a reducing gas to 400° C. and charging the reducing gas upwardly through the acceptor bed for 20 minutes at a gaseous hourly space velocity of 500. Each of the acceptors were evaluated utilizing only hydrogen as the reducing gas, and also utilizing hydrogen admixed with carbon monoxide in a 1:1 mole ratio, the reducing gas in either case being employed in a 1:4 ratio with steam. Again, the reactor effluent was analyzed and discharged to the atmosphere through a wet test meter. The solid acceptors were evaluated over about eight acceptance-regeneration cycles. The average acceptance efficiency per acceptance cycle was determined, the acceptance efficiency being the actual capacity of the acceptor for sulfur dioxide as a percentage of the sulfur dioxide bed. The average regeneration efficiency per regeneration cycle was likewise determined after about eight cycles, the regeneration efficiency being the percent of available copper reduced to the elemental metal during the regeneration cycle. The acceptance and regeneration efficiencies are tabulated below.

| Acceptor | Acceptance Efficiency | | Regeneration Efficiency | |
|---|---|---|---|---|
| | $H_2$ Regen. | $H_2$/CO Regen. | $H_2$ Regen. | $H_2$/CO Regen. |
| I | 91 | — | 87 | — |
| II | 98 | 98 | 70 | 90 |
| III | 96 | 96 | 86 | 98 |
| IV | 97 | 98 | 71 | 92 |

The data demonstrate a substantially improved acceptance efficiency of the solid acceptor of this invention, i.e. Acceptors II, III and IV. While the regeneration efficiency does not quite measure up to that of the prior art acceptor, i.e., Acceptor I, when using only hydrogen as the reducing gas, the regeneration efficiency is substantially improved utilizing the hydrogen/carbon monoxide mixture.

EXAMPLE V

To further demonstrate the contribution of the platinum group metal component in combination with germanium, rhenium or tin, a solid acceptor was prepared containing about 5 wt.% copper, 0.05 wt.% platinum and 0.05 wt.% rhenium. In the preparation, 1/16" spheroidal gamma-alumina particles, substantially as described in Example I, were utilized as a carrier material. Sixty-five grams of the spheroidal particles were immersed in an impregnating solution contained in a steam-jacketed rotary dryer. The impregnating solution was formulated by dissolving 13.21 grams of copper nitrate trihydrate, 10.52 milliliters of chloroplatinic acid solution (3.08 mg of pt/ml), and 2.24 milliliters of perrhenic acid solution (10 mg of re/ml) in about 100 milliliters of water. The spheres were tumbled in the solution at ambient temperature conditions for about ½ hour after which steam was applied to the dryer jacket and the solution evaporated to dryness in contact with the tumbling spheres. The impregnated spheres were then calcined in air for 1 hour at 535° C. to yield a solid acceptor containing about 5 wt.% copper, 0.05 wt.% platinum and 0.05 wt.% rhenium.

The solid acceptor of the foregoing example, hereinafter referred to as Acceptor V, was subjected to a comparative evaluation test with respect to Acceptor I, which contained only the copper component. The test was designed to demonstrate the catalytic effect of the added platinum-rhenium components on the carbon monoxide reduction of copper sulfate during the regeneration cycle. In the comparative evaluation test, 100 cc. of the solid acceptor was in each case disposed as a fixed bed in a vertical tubular reactor with a ⅞" inside diameter. A gaseous mixture of about 0.2 vol.% sulfur dioxide, 3 vol.% oxygen, 15 vol.% steam and about 81.8 vol.% nitrogen was preheated to 400° C. and charged upflow through the acceptor bed at a gaseous hourly space velocity of about 5100. After 1 hour, the solid acceptor was regenerated by preheating a reducing gas comprising equimolar amounts of hydrogen and carbon monoxide to 400° C., and charging the gaseous mixture upwardly through the acceptor bed at a gaseous hourly space velocity of about 500. The reducing gas was employed in a 1:4 ratio with steam. The reactor effluent was analyzed by gas chromatography and discharged to the atmosphere through a wet test meter. The results are tabulated below.

| Time, min. | | Regeneration Off-Gas, % | | | |
|---|---|---|---|---|---|
| Acc. I | Acc. V | $H_2$ | CO | $CO_2$ | $SO_2$ |
| 0 | — | 47.2 | 52.7 | 0.1 | 0 |
| — | 0 | 46.3 | 53.7 | | |
| — | 3 | 2.2 | 3.0 | 58.7 | 36.1 |
| 5 | — | 1.3 | 68.8 | 8.4 | 22.7 |
| — | 6 | 0 | 0.1 | 60.6 | 39.3 |
| — | 9 | 0 | 13.5 | 55.2 | 31.3 |
| 10 | — | 0 | 69.4 | 7.9 | 22.7 |
| — | 12 | 5.7 | 44.7 | 31.4 | 18.2 |
| 15 | — | 0 | 67.9 | 7.6 | 24.4 |
| — | 15 | 40.1 | 53.5 | 7.4 | 3.0 |
| — | 18 | 43.5 | 55.2 | 0.4 | 0.9 |
| 20 | — | 4.7 | 72.8 | 7.4 | 15.0 |
| — | 20 | 44.0 | 55.1 | 0.4 | 0.4 |
| 25 | — | 42.9 | 54.7 | 0.5 | 1.9 |
| 30 | — | 45.8 | 53.7 | 0.2 | 0.3 |

It will be appreciated that the catalytic effect of the added platinum-rhenium component on the carbon monoxide reduction of copper sulfate during the regeneration cycle is measured by the formation and recovery of carbon dioxide in the regeneration off-gases. For example, early in the regeneration cycle, after only 5-6 minutes of regeneration, the regenerator off-gases from Acceptor V (containing the added platinum-rhenium component) analyzed 60.6% carbon dioxide and, as a consequence of the improved reduction capacity of the carbon monoxide, the regeneration off-gases further analyzed 39.3% sulfur dioxide. On the other hand, the regeneration off-gases from Acceptor I (containing only a copper component) analyzed only 8.4% carbon dioxide, taking little advantage of the carbon monoxide reducing agent. As a consequence, the regeneration off-gases analyzed only 22.7% sulfur dioxide.

We claim as our invention:

1. In a process for the separation of inorganic sulfur oxides by oxidation of said inorganic sulfur oxides from a gaseous mixture containing said inorganic sulfur oxides and oxygen in which said gaseous mixture is contacted with a solid sulfur oxides acceptor comprising copper, copper oxide or a mixture thereof dispersed on a carrier material at a temperature of from about 150° C. to about 450° C. and in which said acceptor is regenerated with a reducing gas, the improvement which comprises the addition to said carrier material of about 0.01 to about 1.0 wt.% of said solid acceptor of a platinum group metal or an oxide thereof and a component of about 0.01 to about 1.0 wt.% of said solid acceptor selected from the group consisting of germanium, rhenium, tin and oxides thereof.

2. The improvement of claim 1 further characterized in that said platinum group metal is platinum.

3. The improvement of claim 1 further characterized in that said platinum group metal is palladium.

4. The improvement of claim 1 further characterized in that said platinum group metal is platinum in combination with palladium.

5. The improvement of claim 1 further characterized in that said selected component is germanium.

6. The improvement of claim 1 further characterized in that said selected component is rhenium.

7. The improvement of claim 1 further characterized in that said selected component is tin.

8. The improvement of claim 1 further characterized in that said carrier material is alumina having a surface area of at least about 50 square meters per gram.

9. The improvement of claim 1 further characterized in that said solid carrier material is gamma-alumina.

10. The improvement of claim 1 further characterized in that said reducing gas comprises hydrogen and carbon monoxide.

11. The improvement of claim 1 further characterized in that said sulfur dioxide-loaded acceptor is regenerated by heating the same in contact with a reducing gas comprising carbon monoxide and hydrogen in a mole ratio of from about 0.5:1 to about 1.5:1 and from about 50 to about 90 vol.% steam at a temperature of from about 350° to about 450° C.

* * * * *